US010564805B2

(12) United States Patent
Mishra et al.

(10) Patent No.: US 10,564,805 B2
(45) Date of Patent: Feb. 18, 2020

(54) DETERMINING CONTENT SESSIONS USING CONTENT-CONSUMPTION EVENTS

(71) Applicant: Oath Inc., New York, NY (US)

(72) Inventors: Nikhil Mishra, Santa Clara, CA (US); Mike Wexler, Mountain View, CA (US)

(73) Assignee: Oath Inc., New York, NY (US)

(*) Notice: Subject to any disclaimer, the term of this patent is extended or adjusted under 35 U.S.C. 154(b) by 350 days.

(21) Appl. No.: 14/673,854

(22) Filed: Mar. 30, 2015

(65) Prior Publication Data

US 2016/0292170 A1    Oct. 6, 2016

(51) Int. Cl.
*G06F 3/0482*    (2013.01)

(52) U.S. Cl.
CPC .................................. *G06F 3/0482* (2013.01)

(58) Field of Classification Search
CPC ............... G06F 3/0482; G06F 17/3053; G06F 17/30867; G06F 17/30551; G06Q 50/01
USPC ......................................................... 707/725
See application file for complete search history.

(56) References Cited

U.S. PATENT DOCUMENTS

| | | | | |
|---|---|---|---|---|
| 2013/0187926 A1* | 7/2013 | Silverstein | ........... | G06Q 10/105 345/440 |
| 2013/0294646 A1* | 11/2013 | Shaw | .................... | G06T 7/0048 382/103 |
| 2014/0129942 A1* | 5/2014 | Rathod | ............ | H04N 21/44222 715/720 |
| 2014/0188766 A1* | 7/2014 | Waldman | .......... | G06F 17/30994 705/400 |
| 2014/0193047 A1* | 7/2014 | Grosz | ................... | G06F 3/1242 382/118 |
| 2014/0195921 A1* | 7/2014 | Grosz | ................... | G06F 3/1242 715/738 |
| 2014/0244429 A1* | 8/2014 | Clayton | ............. | G06Q 30/0631 705/26.7 |
| 2014/0279233 A1* | 9/2014 | Lau | ..................... | G06Q 30/0207 705/26.41 |
| 2014/0328578 A1* | 11/2014 | Shafron | ................. | H04N 21/63 386/328 |
| 2014/0334796 A1* | 11/2014 | Galant | .................... | G11B 27/28 386/241 |
| 2014/0337346 A1* | 11/2014 | Barthel | ............. | G06F 17/30899 707/738 |

(Continued)

*Primary Examiner* — Syed H Hasan
*Assistant Examiner* — Nicholas E Allen
(74) *Attorney, Agent, or Firm* — Cooper Legal Group, LLC

(57) ABSTRACT

Software for an online content service obtains a plurality of events chronologically generated by a plurality of users of an online content service during a specified period of time. The software identifies any content items associated with each event and annotates each of the content items with (a) a plurality of metadata attributes associated with the content item and (b) a plurality of metadata attributes associated with the online content service. The software sorts the events based on user and based on content identifier and orders the sorted events based on timestamp. The software determines the events that make up a content session for the specific content item and the specific user, using the ordered events for the specific content item and a look-back time period and a look-ahead time period. Then the software generates an analytic based at least in part on the content session.

18 Claims, 9 Drawing Sheets

(56) References Cited

U.S. PATENT DOCUMENTS

| | | | |
|---|---|---|---|
| 2014/0351233 A1* | 11/2014 | Crupi | G06F 17/30516 |
| | | | 707/706 |
| 2015/0019537 A1* | 1/2015 | Neels | G06F 17/30551 |
| | | | 707/722 |
| 2015/0036882 A1* | 2/2015 | Fan | G08B 13/196 |
| | | | 382/103 |
| 2015/0058336 A1* | 2/2015 | Davis | G06F 17/30867 |
| | | | 707/732 |
| 2015/0081790 A1* | 3/2015 | Ogawa | G06F 17/30595 |
| | | | 709/204 |

* cited by examiner

Activity Log

| Timestamp | UserID | ContentID | Action/Event |
|---|---|---|---|
| 1. 03-29-15:09:45:00 | UserA_1 | Page9831 With SelmaMovieVideo221 | Loaded Newsfeed |
| 2. 03-29-15:09:45:08 | UserA_1 | SelmaMovieVideo221 | Play: 17 seconds of 24 seconds |
| 3. 03-29-15:09:45:56 | UserB_3 | BleacherReportArticle400 | No Click on URL in Newsfeed |
| 4. 03-29-15:09:50:25 | UserB_3 | MotleyFoolArticle347 with Link to WSJarticle5 | Click on URL in Newsfeed |
| 5. 03-29-15:10:01:35 | UserA_1 | SelmaMovieVideo221 | Share to Facebook |
| 6. 03-29-15:11:14:18 | UserA_1 | VarietyArticleSelmaMovie | Click on URL in Search Results: query is "Selma movie" |
| 7. 03-29-15:11:34:12 | UserA_1 | ESPNarticle4978 | Click on URL in Newsfeed |
| 8. 03-29-15:11:34:45 | UserB_3 | WSJarticle5 | Click on URL in Module at WSJ Site |

Content Consumption Events in Content Session

| Timestamp | UserID | ContentID | Action/Event |
|---|---|---|---|
| 1. 03-29-15:09:45:00 | UserA_1 | Page9831 With SelmaMovieVideo221 | Loaded Newsfeed |
| 2. 03-29-15:09:45:08 | UserA_1 | SelmaMovieVideo221 | Play: 17 seconds of 24 seconds |
| 5. 03-29-15:10:01:35 | UserA_1 | SelmaMovieVideo221 | Share to Facebook |
| 6. 03-29-15:11:14:18 | UserA_1 | VarietyArticleSelmaMovie | Click on URL in Search Results: query is "Selma movie" |
| 7. 03-29-15:11:34:12 | UserA_1 | ESPNarticle4978 | Click on URL in Newsfeed |

DETERMINING CONTENT SESSIONS USING CONTENT-CONSUMPTION EVENTS

BACKGROUND

When a user logs into a website for an online content service, the user begins a browsing session in which the user's activities or events can be analyzed to determine such things as webpage navigation, session duration, internal referrals, and/or external referrals.

Some online content services encompass multiple websites. If a user visits a number of these websites after logging onto an online content service, the user's activities or events on a specific website can be analyzed as a subsession.

However, browsing sessions and subsessions do not lend themselves to granular analysis of user engagement with a specific item of content, such as a text article or video.

SUMMARY

In an example embodiment, a processor-executed method is described. According to the method, software for an online content service obtains a plurality of events chronologically generated by a plurality of users of an online content service during a specified period of time. Each of the events is a content-consumption event. The software identifies any content items associated with each event and annotates each of the content items with (a) a plurality of metadata attributes associated with the content item and (b) a plurality of metadata attributes associated with the online content service. The software sorts the events based on user or browser identifier and based on content identifier and orders the sorted events for a specific content item and a specific user based on timestamp. The software determines the events that make up a content session for the specific content item and the specific user, using the ordered events for the specific content item and a look-back time period and a look-ahead time period. Then the software generates an analytic based at least in part on the content session for the specific content item and the metadata that annotates the specific content item and displays a graphical user interface (GUI) based at least in part on the analytic.

In another example embodiment, an apparatus is described, namely, computer-readable media which persistently store a program run by an online content service. The program obtains a plurality of events chronologically generated by a plurality of users of an online content service during a specified period of time. Each of the events is a content-consumption event. The program identifies any content items associated with each event and annotates each of the content items with (a) a plurality of metadata attributes associated with the content item and (b) a plurality of metadata attributers associated with the online content service. The program sorts the events based on user or browser identifier and based on content identifier and orders the sorted events for a specific content item and a specific user based on timestamp. The program determines the events that make up a content session for the specific content item and the specific user, using the ordered events for the specific content item and a took-back time period and a look-ahead time period. Then the program generates an analytic based at least in part on the content session for the specific content item and the metadata that annotates the specific content item and displays a GUI based at least in part on the analytic.

Another example embodiment also involves a processor-executed method. According to the method, software for an online content service obtains an event associated with a user identifier of the online content service. The event is a recent event in a stream of a plurality of events that are content-consumption events. The software identifies any content items associated with the event and annotates each content item with (a) a plurality of metadata attributes associated with the content item and (b) a plurality of metadata attributes associated with the online content service. The software determines that event is part of a content session of the user for a specific content item. Then the software generates an analytic based at least in part on the content session and the metadata that annotates the specific content item and displays a GUI based at least in part on the analytic. Each operation in the method is executed in real-time or near real-time.

BRIEF DESCRIPTION OF THE DRAWINGS

FIG. 5A depicts an activity log, in accordance with an example embodiment.

FIG. 5B depicts the content-consumption events in a content session, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning Likewise, the phrase "in an example embodiment" as used herein does not necessarily refer to the same embodiment and the phrase "in another example embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
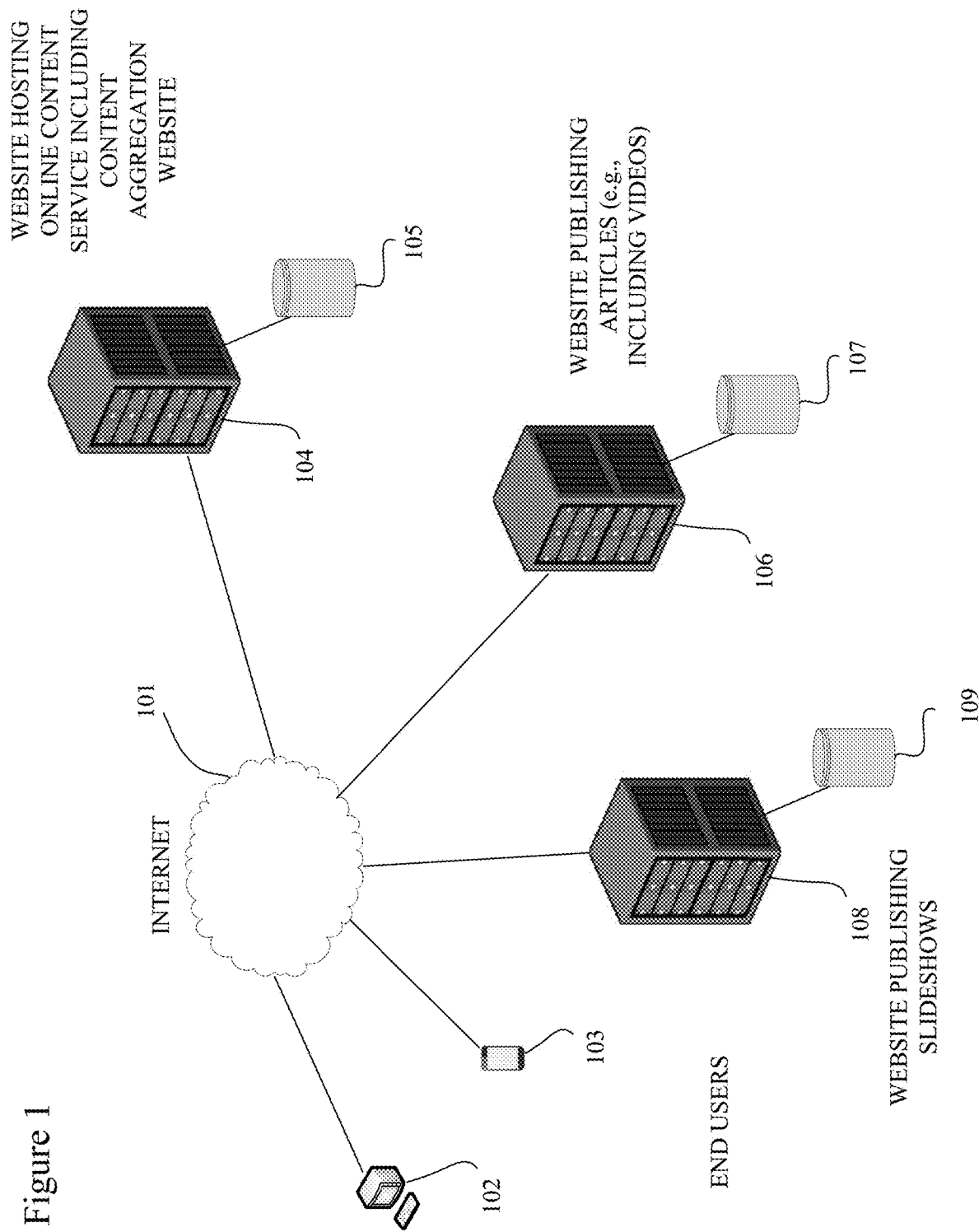
FIG. 1 is a network diagram showing a website hosting an online content service, in accordance with an example embodiment.

FIG. 1 is a network diagram showing a website hosting an online content service, in accordance with an example embodiment. As depicted in this figure, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which might be wireless in part or in whole) with a website 104 hosting an online content service (e.g., including a content-aggregation website), a website 106 publishing news stories/articles including videos (e.g., the website for the New York Times or a website publishing blogs), and a website 108 publishing slideshows (e.g., the website for Flickr).

In an example embodiment, website 104 might be a website such as Yahoo! or Google, which includes numerous websites that perform various online content services, one of which is aggregating (or ingesting) content from the Internet through "push" technology (e.g., a subscription to a web feed such as an RSS feed) and/or "pull" technology (e.g., web crawling), including stories and/or videos (or Uniform Resource Locators (URLs) for stories and/or videos) from website 106 and slideshows (or URLs for slideshows) from website 108. And as used in this disclosure, the term "content aggregation" is to be broadly interpreted to include any online service, including a social-media service, that allows its users to, among other things, access and/or annotate (e.g., comment on) content (e.g., text including web links, mail messages, text messages, etc., images, slideshows, videos, animations, audio recordings, games and other software, etc.) aggregated/ingested by the online service (e.g., using its own curators and/or its own algorithms) and/or its users and presented to its users, e.g., in a "wall" view or "stream" view. It will be appreciated that a website hosting content aggregation might have social features based on a friend list, contact list, buddy list, social graph, interest graph, distribution list, or other control list that is accessed over the network from a social-networking website through an application programming interface (API) exposed by the social-networking website. For example, Yahoo! News might identify the content items in its newsfeed (e.g., as displayed on the front page of Yahoo! News) that have been viewed and/or read by a user's friends, as listed on a Facebook friend list that the user has authorized Yahoo! News to access. Or Yahoo! News might identify the content items in its newsfeed (e.g., as displayed on the front page of Yahoo! News) that have been visited from an online social network, e.g., via a post in a stream in an online social network.

Furthermore, website 104 might include an online social network such as Facebook or Twitter, e.g., as another online content service. As used here and elsewhere in this disclosure, the term "online social network" is to be broadly interpreted to include, for example, any online content service, including a social-media service, that allows its users to, among other things, (a) selectively access (e.g., according to a friend list, contact list, buddy list, social graph, interest graph, or other control list) content (e.g., text including web links, mail messages, text messages, etc., images, slideshows, videos, animations, audio recordings, games and other software, etc.) associated with each other's profiles (e.g., Facebook walls, Flickr photo albums, Pinterest boards, etc.); (b) selectively (e.g., according to a friend list, contact list, buddy list, social graph, interest graph, distribution list, or other control list) broadcast content (e.g., text including web links, mail messages, text messages, etc., images, slideshows, videos, animations, audio recordings, games and other software, etc.) to each other's newsfeeds (e.g., content/activity streams such as Facebook's News Feed, Twitter's Timeline, Google+'s Stream, etc.); and/or (c) selectively communicate (e.g., according to a friend list, contact list, buddy list, social graph, interest graph, distribution list, or other control list) with each other (e.g., using a messaging protocol such as email, instant messaging, short message service (SMS), etc.).

In an example embodiment, websites 104, 106, and 108 might be composed of a number of servers (e.g., racked servers) connected by a network (e.g., a local area network (LAN) or a WAN) to each other in a cluster (e.g., a load-balancing cluster, a Beowulf cluster, a Hadoop cluster, etc.) or other distributed system which might run website software (e.g., web-server software, database software, search-engine software, etc.), and distributed-computing and/or cloud software such as Map-Reduce, Google File System, Hadoop, Hadoop File System, Pig, Hive, Google Dremel, Google MillWheel, Apache Hadoop YARN, Cloud-Base, etc. The servers in website 104 might be connected to persistent storage 105, the servers in website 106 might be connected to persistent storage 107, and the servers at website 108 might be connect to persistent storage 109. Persistent storages 105, 107, and 109 might include flash memory, a redundant array of independent disks (RAID), and/or a storage area network (SAN), in an example embodiment. In an alternative example embodiment, the servers for websites 104, 106, and 108 and/or the persistent storage in persistent storages 105, 107, and 109 might be hosted wholly or partially in a public and/or private cloud, e.g., where the cloud resources serve as a platform-as-a-service (PaaS) or an infrastructure-as-a-service (IaaS).

Persistent storages 105, 107, and 109 might be used to store content (e.g., text including web links, mail messages, text messages, etc., images, slideshows, videos, animations, audio recordings, games and other software, etc.) and/or its related data. Additionally, persistent storage 105 might be used to store data related to users and their social contacts (e.g., Facebook friends), as well as software including algorithms and other processes for presenting the content to the users, e.g., in a personalized stream which might be ordered from top to bottom (a) in reverse chronology (e.g., latest in time on top), or (b) according to personalization scores. In an example embodiment, some of the content (and/or its related data) stored in persistent storages 105, 107, and 109 might have been received from a content delivery or distribution network (CDN), e.g., Akami Technologies. Or, alternatively, some of the content (and/or its related data) might be delivered directly from the CDN to the personal computer 102 or the mobile device 103, without being stored in persistent storages 105, 107, and 109.

Personal computer 102 and the servers at websites 104, 106, and 108 might include (1) hardware consisting of one or more microprocessors (e.g., from the x86 family, the ARM family, or the PowerPC family), volatile storage (e.g., RAM), and persistent storage (e.g., flash memory, a hard disk, or a solid-state drive), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family or the x86 family), volatile storage (e.g., RAM), and persistent storage (e.g., flash memory such as microSD), (2) an operating system (e.g., iOS, webOS, Windows Mobile, Android, Linux, Symbian OS, RIM BlackBerry OS, etc.) that runs on the hardware, and (3) one or more accelerometers, one or more gyroscopes, global positioning system (GPS) or other location-identifying type capability.

Also in an example embodiment, personal computer 102 and mobile device 103 might each include a browser as an application program or as part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and webOS Browser. It will be appreciated that users of personal computer 102 and/or mobile device 103 might use browsers to access content presented by websites 104, 106, and 108. Alternatively, users of personal computer 102 and/or mobile device 103 might use application programs (e.g., native apps, including hybrid apps that display HTML content) to access content presented by websites 104, 106, and 108.

Figure 2:
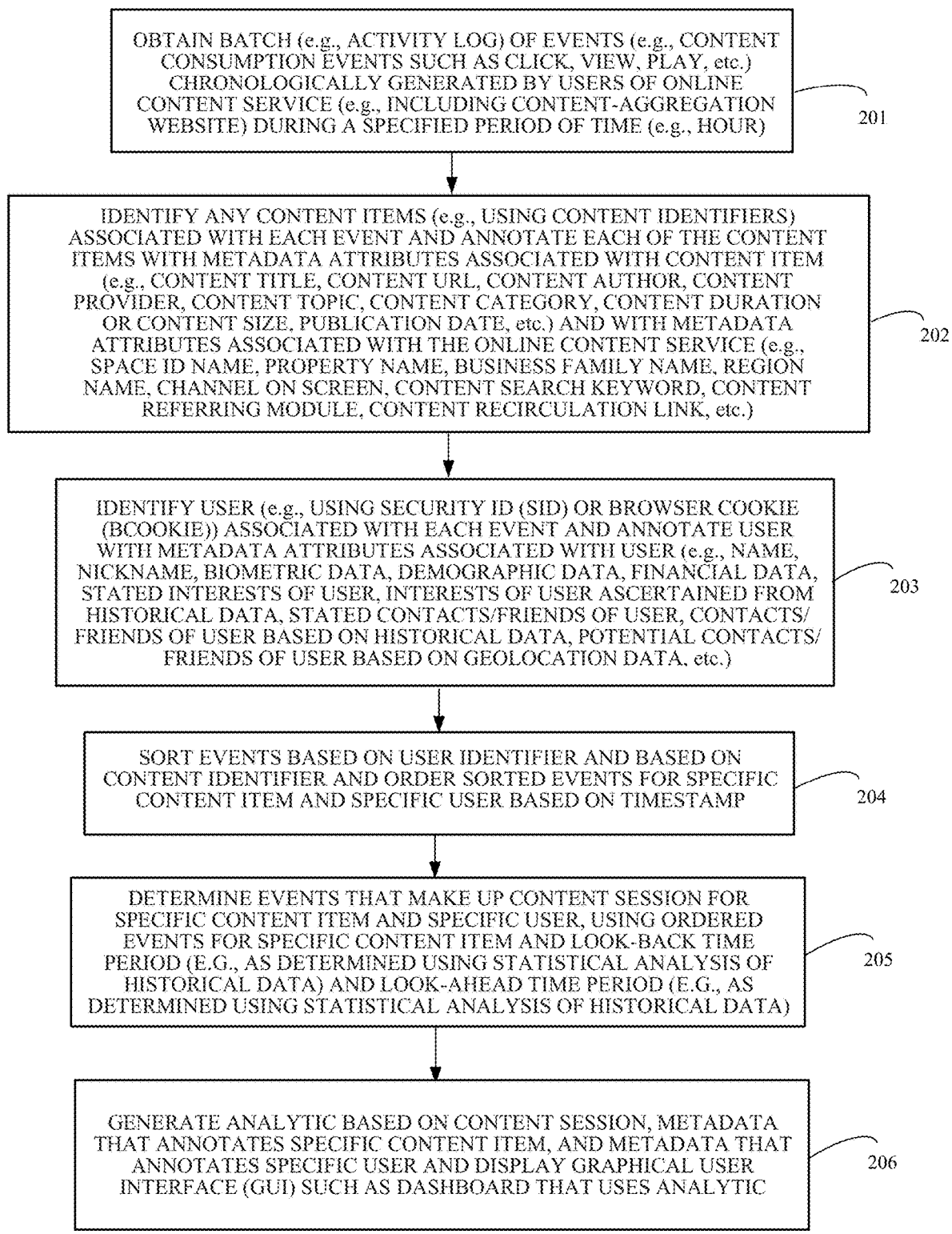
FIG. 2 is a flowchart diagram of a batch process for determining a content session using annotated content-consumption events, in accordance with an example embodiment.

FIG. 2 is a flowchart diagram of a batch process for determining a content session using annotated content-consumption events, in accordance with an example embodiment. In an example embodiment, some or all of the operations shown in this figure might be performed by software running on servers at website 104 hosting the online content service (e.g., Yahoo!, Google, Yahoo! News, Google News, Facebook, Twitter, etc.) using persistent storage 105. Or, some or all of the operations shown in this figure might be performed by software (e.g., a webpage with embedded JavaScript (or ActionScript) or an application such as a native app) running on a client device (e.g., personal computer 102 or mobile device 103).

As depicted in FIG. 2, the software obtains a batch (e.g., an activity log) of events (e.g., content consumption events such as click, view, play, non-click, etc.) chronologically generated by users of an online content service (e.g., that includes a content-aggregation website) during a specified period of time (e.g., an hour), in operation 201. In operation 202, the software identifies any content items (e.g., using content identifiers) associated with each event and annotates each of the content items with metadata attributes associated with (a) the content item (e.g., content title, content URL, content author, content provider, content type (e.g., video), content category (e.g., sports), content topic (e.g., the Super Bowl), content duration (e.g., the duration of a video) or content size (e.g., the number of characters and/or words in a text article), publication date, etc.) and (b) the online content service (e.g., canvas ID or space ID name, property name, business family name, region name, device, channel on screen, content search keyword, content referring module, content recirculation link, etc.).

In operation 203, the software identifies the user associated with each event and annotates the user with metadata attributes associated with the user (e.g., name, nickname, biometric data, demographic data, financial data, stated interests of user, interests of user inferred from historical data, stated contacts/friends of user, contacts/friends of user inferred from historical data, potential contacts/friends of user based on geo-location data, etc.). By way of non-limiting example, if the user has logged into an account with the online content service, the user might be identified using a security identifier (SID), such as a Microsoft SID. Or if the user has not logged into an account with the online content service, the user might be identified by a browser cookie (bcookie)) or a device identifier (e.g., if a native app is being used rather than a browser). In an example embodiment, the identifier associated with the user might be used on or across multiple devices and/or platforms, e.g., the identifier might be similar to an SID. Or, the identifier associated with the user might be more device-specific and/or platform-specific, e.g., the identifier might be similar to a bcookie or a device identifier.

The software sorts the events based on the user identifier and based on the content identifier and orders the sorted events for a specific content item and a specific user based on timestamp, in operation 204. In operation 205, the software determines the events that make up a content session for the specific content item and the specific user, using the ordered events for the specific content item and a look-back time period (e.g., as determined using statistical analysis of historical data) and a look-ahead time period (e.g., as determined using statistical analysis of historical data), as explained in greater detail below. Then in operation 206, the software generates an analytic based on the content session, the metadata that annotates the specific content item, and metadata that annotates the specific user and displays a graphical user interface (GUI) such as a dashboard (e.g., as a webpage or a view in a native app) that uses the analytic. An example of such a GUI might be the dashboards and other GUIs displayed by Google Analytics. Alternatively, the analytic might be used in a report, e.g., prepared for the online content service (e.g., Yahoo!) and/or electronically distributed by the online content service to a business partner (e.g., CBS Sports or CBS Interactive).

In operation 202, the software annotates each content item with metadata attributes associated with the content item. In an example embodiment, a content item might be or include text (including an article (or story), a blog post, a mail message, a text message, etc.), an image, a slideshow, a video stream or recording, an audio stream or recording, etc., or be a multimedia combination of all or any of the foregoing, including a game or other executable.

Also in operation 202, the software annotates each content item with metadata attributes associated with the online content service (which might be called "canvas metadata" or "context metadata" because it is metadata related to where a content item appeared), including: canvas ID or space ID name, property name, business family name, region name, device, channel on screen, content search keyword, content referring module, content recirculation link, etc. In an example embodiment, a canvas ID or space ID name might be an identifier that represents a location where a content item appeared, e.g., a webpage (e.g., the Yahoo! homepage, the Yahoo! News homepage, etc.) or a location on a webpage, or, if the user is using a native app that does not use webpages, a view or a location on a view displayed by the native application. In an example embodiment, the webpage might be served by the online content service (e.g., Yahoo!) or it might be served by a business partner of the online content service (e.g., CBS Sports or CBS Interactive). Also, in an example embodiment, a property name might be made up of a business family name (e.g., Yahoo! homepage, Yahoo! News, Yahoo! Sports, etc.), a region name (e.g., US, ES, IN, etc.), and a device (e.g., desktop, mobile device, tablet, etc.). An example of such a property name is: Homepage-US-Desktop. It will be appreciated that a property name reflects a hierarchical organizational system which might be used to tailor (or customize) the analytics that are generated by the processes described in this disclosure.

In an example embodiment, the term "channel on screen" might refer to a video channel that is analogous to a television channel. For example, videos related to particular musical artist (e.g., Miley Cyrus) or a particular television show (e.g., "Saturday Night Live") might be grouped together for display on a webpage or view served by the online content service. The term "channel" might also refer to categories (or domains) of online content services. For example, a channel called "search" might include Google, Bing, etc. And a channel called "social" might include Facebook, Twitter, Google Plus, etc. Channels of this sort might be used when describing content-referring modules, as explained in greater detail below.

In an example embodiment, a content search keyword might be a keyword that causes a content item (or its URL) to appear in search results when the keyword is entered as a query. And in an example embodiment, a content recirculation link might be a URL which (a) is associated with a content item during display on a webpage (or view) served by the online content service or a business partner of the online content service and (b) which links to another webpage (or view) served by the online content service or a business partner. It will be appreciated that such recirculation links help retain users at the websites operated by the online content service and its business partners.

In operation 203, the software identifies a user and annotates the user with metadata associated with the user. In an example embodiment, the software might not annotate the user with the metadata associated with the user, e.g., in order to expedite the process.

In operation 205, the software determines the events (e.g., content consumption events) that make up a content session for a specific content item and a specific user. In an example embodiment, a content session might include all the events where the specific user engages with the specific content item, as well as the events of the specific user that occur proximately prior (e.g., in terms of time (e.g., thirty minutes) or in terms of webpage-navigation sequence (e.g., three webpages)) to the specific user landing on the specific content item being engaged with. An example of such a proximately prior event might be the loading of a webpage with the specific content item or a URL for the specific content item. In an example embodiment, a content session might end when: (a) an event associated with the specific user is associated with a content item that has a different content identifier; (b) all of the events for the specific content item and the specific user have been exhausted; or (c) there is a difference of 30 minutes or more in the timestamps for two events with the same content item and the same user. In an example embodiment, the software might also capture the attributes of the user's exit path, when a content session ends. That is to say, a content session might also include the events of the specific user that occur proximately after (e.g., in terms of time (e.g., thirty minutes) or in terms of webpage-navigation sequence (e.g., three webpages)) the specific user stops engaging with a specific content item.

Figure 3:
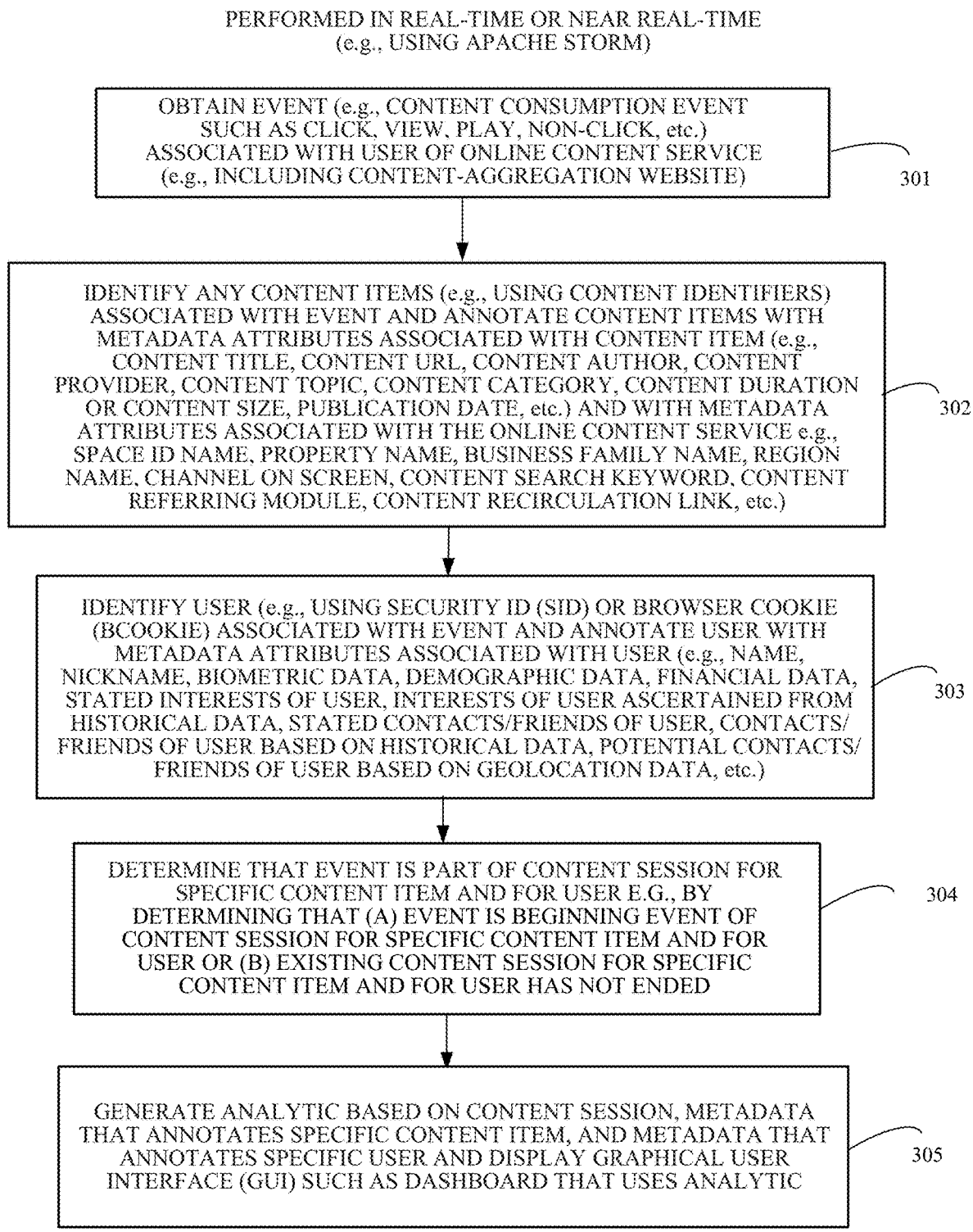
FIG. 3 is a flowchart diagram of a streaming process for determining a content session using annotated content-consumption events, in accordance with an example embodiment.

FIG. 3 is a flowchart diagram of a streaming process for determining a content session using annotated content-consumption events, in accordance with an example embodiment. Here again, in an example embodiment, some or all of the operations shown in this figure might be performed by software running on servers at website 104 hosting the online content service (e.g., Yahoo!, Google, Yahoo! News, Google News, Facebook, Twitter, etc.). Or, some or all of the operations shown in this figure might be performed by software (e.g., a webpage with embedded JavaScript (or ActionScript) or an application such as a native app) running on a client device (e.g., personal computer 102 or mobile device 103).

As noted in the legend at the top of the figure, the operations shown in FIG. 3 might be performed in real-time or near real-time by the software, e.g., using streaming software such as Google's MillWheel or Apache Storm. In operation 301, the software obtains an event (e.g., a content-consumption event such as click, view, play, non-click, etc.) associated with a user of the online content service (e.g., that includes a content-aggregation website). In operation 302, the software identifies any content items (e.g., using content identifiers) associated with the event and annotates each of the content items with metadata attributes associated with (a) the content item (e.g., content title, content URL, content author, content provider, content type (e.g., video), content category (e.g., sports), content topic (e.g., the Super Bowl), content duration (e.g., the duration of a video) or content size (e.g., the number of characters and/or words in a text article), publication date, etc.) and (b) the online content service (e.g., space ID name, property name, business family name, region name, device, channel on screen, content search keyword, content referring module, content recirculation link, etc.). In operation 303, the software identifies the user associated with the event and annotates the user with metadata attributes associated with the user (e.g., name, nickname, biometric data, demographic data, financial data, stated interests of user, interests of user ascertained from historical data, stated contacts/friends of user, contacts/friends of user based on historical data, potential contacts/friends of user based on geo-location data, etc.). Here again, by way of non-limiting example, if the user has logged into an account with the online content service, the user might be identified using a security identifier (SID), such as a Microsoft SID. Or if the user has not logged into an account with the online content service, the user might be identified by a browser cookie (bcookie) or a device identifier (e.g., if a native app is being used rather than a browser). In an example embodiment, the identifier associated with the user might be used on or across multiple devices and/or platforms, e.g., the identifier might be similar to an SID. Or, the identifier associated with the user might be more device-specific and/or platform-specific, e.g., the identifier might be similar to a bcookie or a device identifier.

In operation 304, the software determines that the event is part of a content session for a specific content item and for the user, e.g., by determining that (a) the event is a beginning event of a content session for the specific content item and for the user, or (b) an existing content session for the specific content item and for the user has not ended. Then in operation 305, the software generates an analytic based on the content session, the metadata that annotates the specific content item, and the metadata that annotates the specific user and displays a graphical user interface (GUI) such as a dashboard (e.g., as a webpage or a view in a native app), that uses the analytic. An example of such a GUI might be the dashboards and other GUIs displayed by Google Analytics.

Here again, in operation 303, the software identifies a user and annotates the user with metadata associated with the user. In an example embodiment, the software might not annotate the user with the metadata associated with the user, e.g., in order to expedite the process.

Figure 4:
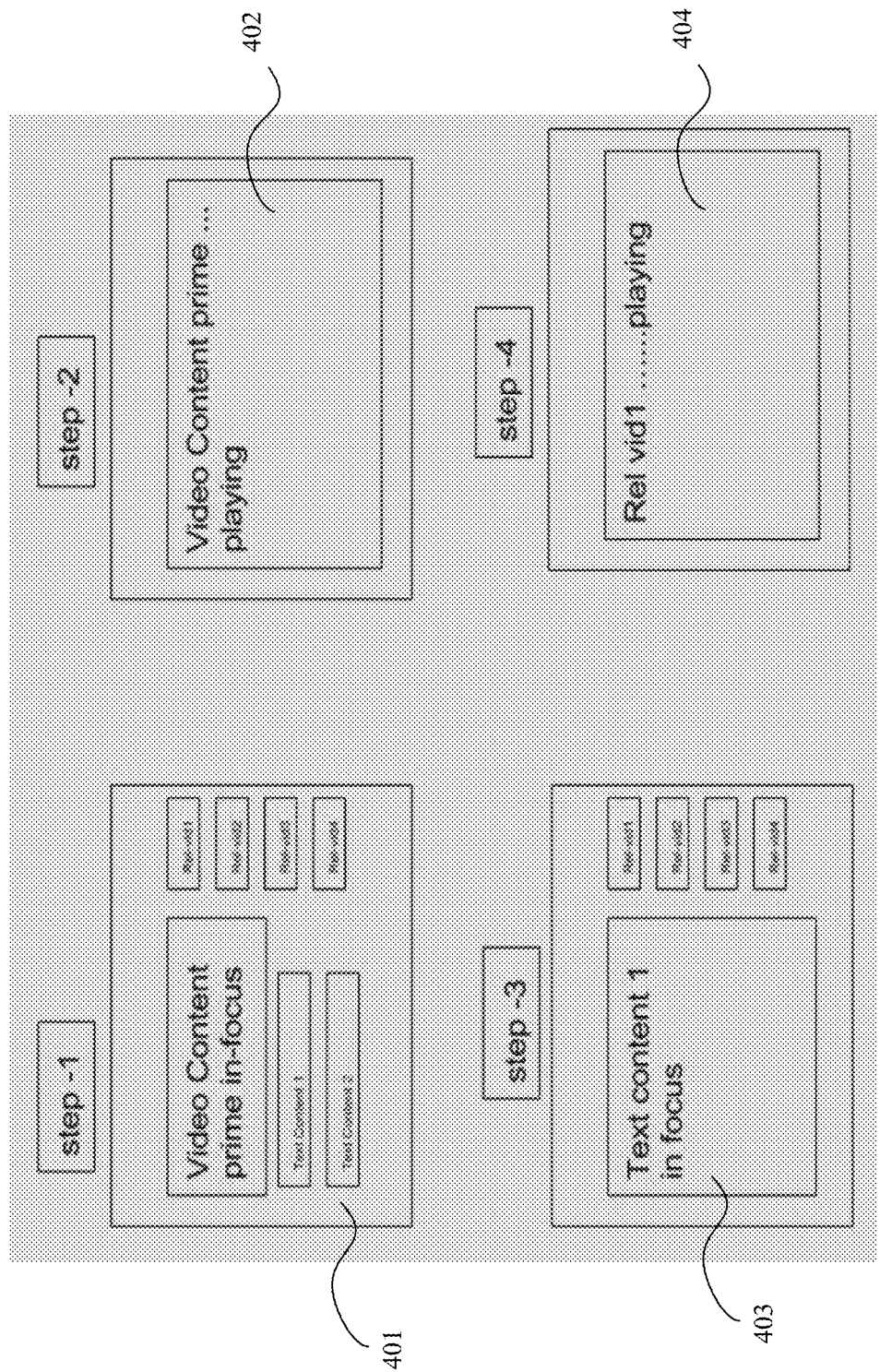
FIG. 4 illustrates a timeline of content-consumption events included in a content session, in accordance with an example embodiment.

FIG. 4 illustrates a timeline of content-consumption events included in a content session, in accordance with an example embodiment. As depicted in this figure, a content session begins when software for an online content service displays a webpage 401 (or a view in a native app) that shows (a) prime video content (e.g., Video Content Prime) in focus, and (b) text content (e.g., Text Content 1) and related video content (Rel Vid 1), in step 1. In step 2, the software displays a webpage 402 with the prime video content playing in a player, e.g., in response to the user clicking on the video in webpage 401. Then in step 3, the software displays a webpage 403 with the text content in focus, e.g., in response to the user clicking on the text content. It will be appreciated that the subject matter (or topic) of the text content might be related to the subject matter of the prime video content or it might not. But given the fact that it was included in webpage 401, it might be considered to be part of the content session for the prime video content. In step 4, the software displays a webpage 404 with the related video content playing in a player, e.g., in response to the user clicking on the video. It will be appreciated that both the text content and the related video content have their own content identifiers. However, the user's engagement with the text content and the related video content is proximate (e.g., in terms of them being presented on webpage 401) to the user's engagement with the prime video content and therefore steps 3 and 4 are included in the content session for the prime video content.

FIG. 5A depicts an activity log, in accordance with an example embodiment. As shown in this figure an activity log 501 (e.g., as described above in FIG. 2) might include a table with columns for Timestamp, UserID, ContentID and Action/Event. It will be appreciated that the entries in these columns are shown as strings rather than numbers (e.g., binary numbers or integers) for illustrative purposes, though the latter might well be used in an exemplary embodiment. It will also be appreciated that only two users are described in this activity log for illustrative purposes, rather than the millions users that might be in an actual activity log for an online content service.

The table includes 8 rows in chronological order. Rows 1-2 and 5-7 are associated with UserID UserA_1, whereas rows 3-4 and 8 are associated with UserID UserB_3. The rows associated with UserID UserA_1 will be discussed in greater detail with respect to FIG. 5B. As indicated in the Action/Event entry in row 3, the software for the online content service might track non-clicks (or non-plays, non-views, etc.) on content items in addition to clicks (or plays, views, etc.), in an example embodiment. It will be appreciated that non-clicks are also useful for generating analytics based on content sessions, e.g., for determining how engaging a content item (e.g., a video) is. Also, as in the Action/Event entry in row 8, the software for the online content service might track user engagement with content items in its modules that are located on websites belonging to its business partners. And in an example embodiment, the Action/Event in row 4 and the Action/Event in row 8 might both be considered to be events in a content session for WSJarticle5 even though there is a timestamp difference greater than 30 minutes between the two events, because the two events are: (a) associated with the same content item; and (b) the latter event occurs within a 2-hour look-ahead time period, as described in greater detail below.

FIG. 5B depicts the content-consumption events in a content session, in accordance with an example embodiment. It will be appreciated that this content session might result from steps 201-205 of the process shown in FIG. 2. Content session 502 begins with row 1, the loading of a Newsfeed webpage, Page9831, into a user's browser. It will be appreciated that a newsfeed is a content stream that might be displayed by a content-aggregation website or a social-networking website, as discussed above. The webpage includes a video content item, SelmaMovieVideo221, whose subject matter is a movie, e.g., "Selma". In row 2, the user plays the video content and, in row 5, shares the video content to a social network, e.g., Facebook. In row 6, the user clicks on a URL for a Variety article whose subject matter is also the movie, "Selma". The URL is included in search results returned to the user, following receipt of a query, e.g., "Selma movie". Then in row 7, the content session ends when the user clicks on a URL in for a different content item, e.g., ESPNarticle4978.

Figure 6:
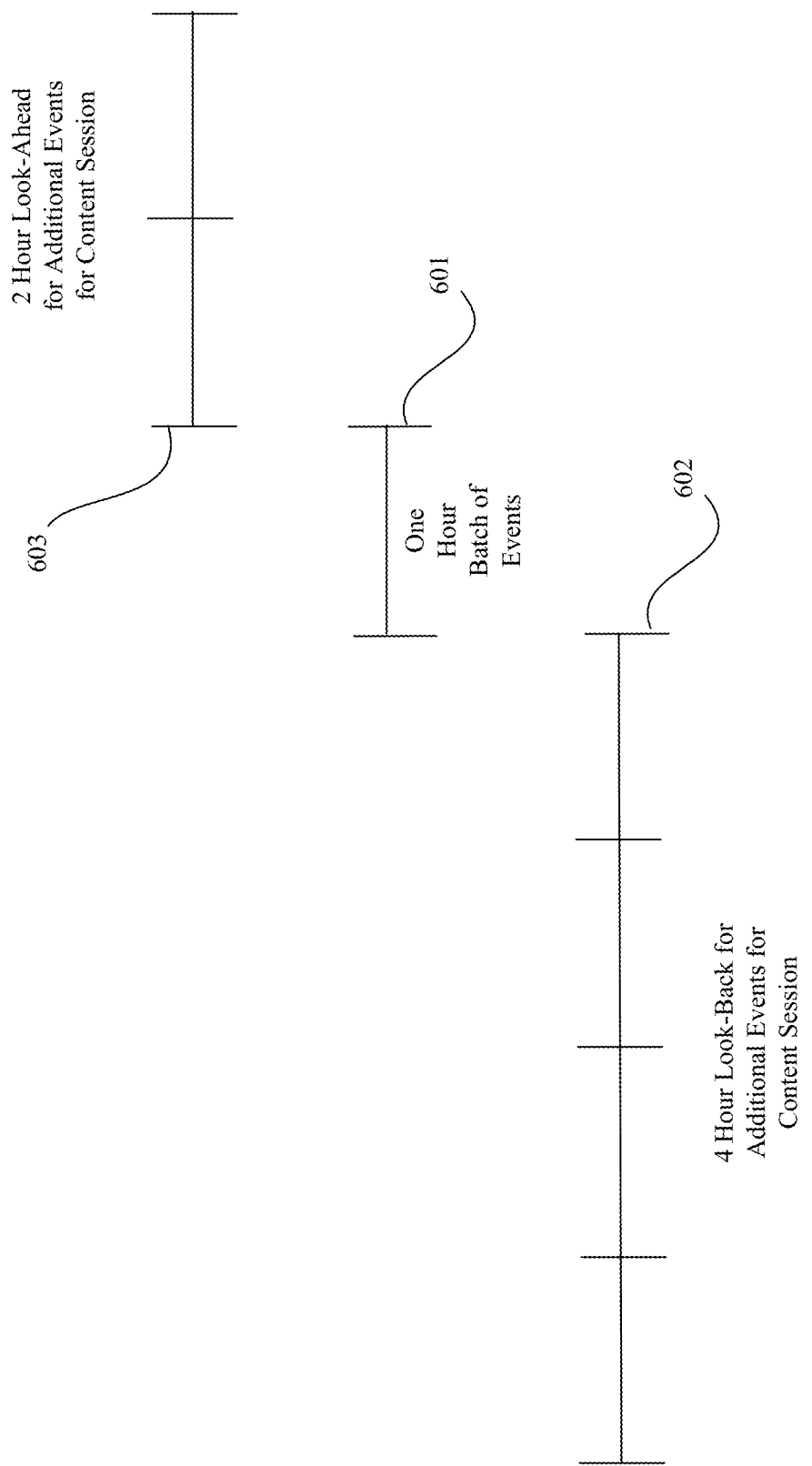
FIG. 6 depicts a look-back period and a look-ahead period, in accordance with an example embodiment.

FIG. 6 depicts a look-back period and a look-ahead period, in accordance with an example embodiment. As indicated in this figure (and FIG. 2 above), the software for an online content service might batch events (e.g., content-consumption events) for an activity log on an hourly basis, for purposes of determining content sessions. In an example embodiment, the software might also examine events in the 4 hours preceding the first event (as shown by time period 602) in the one-hour batch of events (as shown by time period 601) in order to identify other events that are associated with the same content item and the same user. And the software might also examine events in the 2 hours following the last event (as shown by time period 603) in the one-hour batch of events (as shown by time period 601) in order to identify other events that are associated with the same content item and the same user. It will be appreciated that time periods other than 601, 602, and 603 might be used, in an example embodiment. However, to prevent the time periods from being arbitrary, the time periods should result from a statistical analysis of historical data, e.g., to determine a confidence interval derived from a measure of central tendency and a measure of dispersion for a probability distribution (e.g., a normal or Gaussian distribution). In this regard, the time periods 601, 602, and 603 have been empirically determined to include 95% of the events in a content session, using data provided by an online content service (e.g., Yahoo!). And that same data indicated that longer time periods resulted in diminishing returns, e.g., an increase in the time periods by an hour resulted in a negligible increase in the number of events in a content session.

Figure 7:
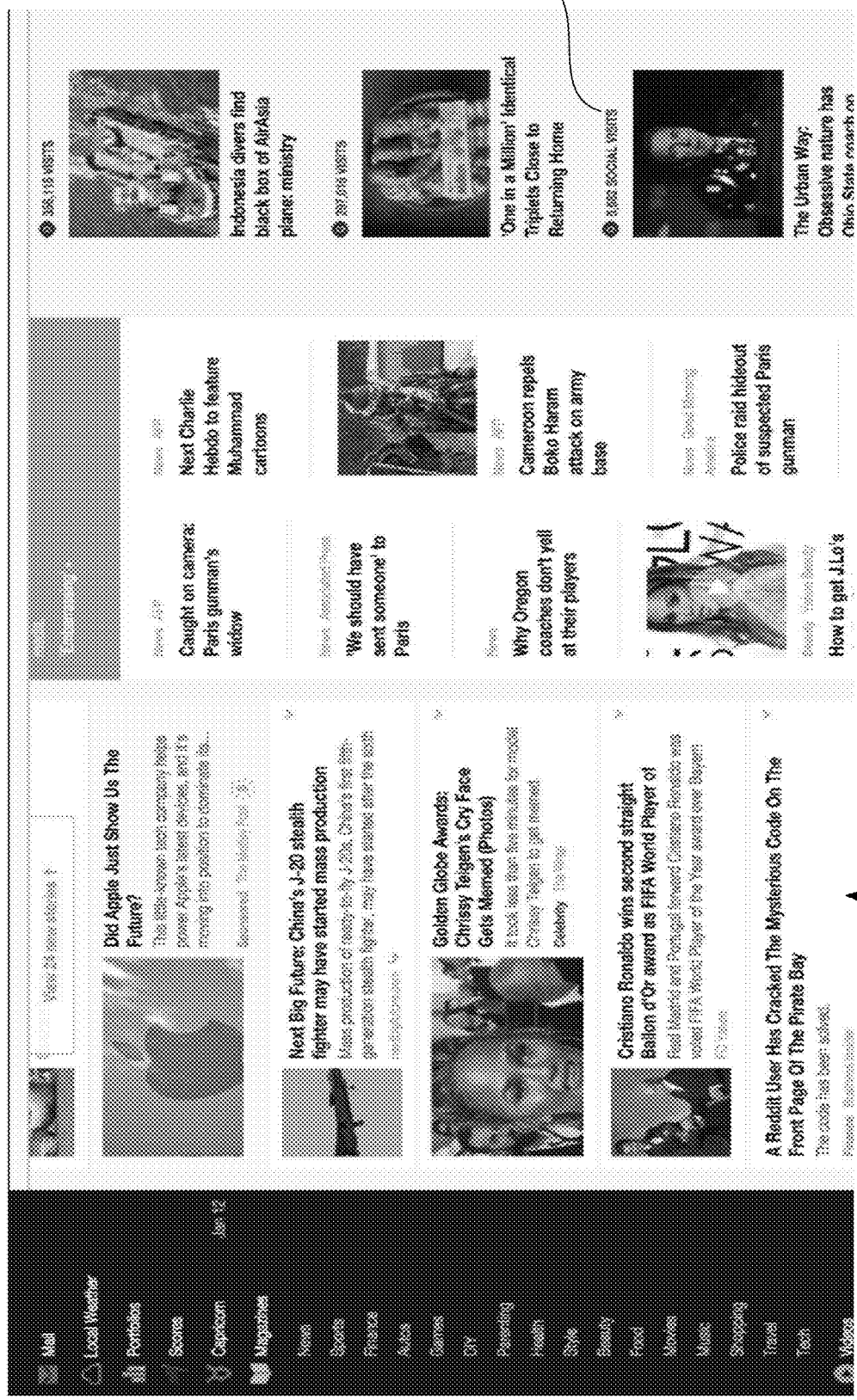
FIG. 7 shows a webpage showing an analytic based on content sessions, in accordance with an example embodiment.

FIG. 7 shows a webpage showing an analytic based on content sessions, in accordance with an example embodiment. In an example embodiment, software for an online content service might display webpage 701 to its users. As indicated by analytic 702, there have been 6,682 social visits to the text article (or story), "The Urban Way". In the context of a text article, a social visit is a content-consumption event that results from a user clicking on a URL for the text article when the text article (or its thumbnail, URL, etc.) is displayed by a module (of the online content service) in a webpage (or view) presented by a social-networking website, e.g., in a user's newsfeed. It will be appreciated that such a module is "content-referring module", as that term was used above. In an example embodiment, content-consumption events associated with a content-referring module might be tracked by the online content service module rather than the social-networking website. It will also be appreciated that such a social-networking website might be a business partner of the online content service, in an example embodiment. That is to say, the online content service might be reimbursed by the social-networking website for any click-throughs on text articles, videos, etc., by users of the social-networking service, if the text articles, videos, etc., originate with the online content service.

However, as indicated above, many other kinds of analytics might be based in whole or in part on a content session. For example, an online content service might use analytics based on content sessions to determine how engaging a specific item of content is. And engagement might be measured in terms of session duration, revenue generated, social sharing, etc. Further, those analytics might be displayed in a GUI dashboard (in the style of Google Analytics) in order to support decisions regarding the profitability or non-profitability of agreements with business partners, licensors, advertisers, etc.

Figure 8:
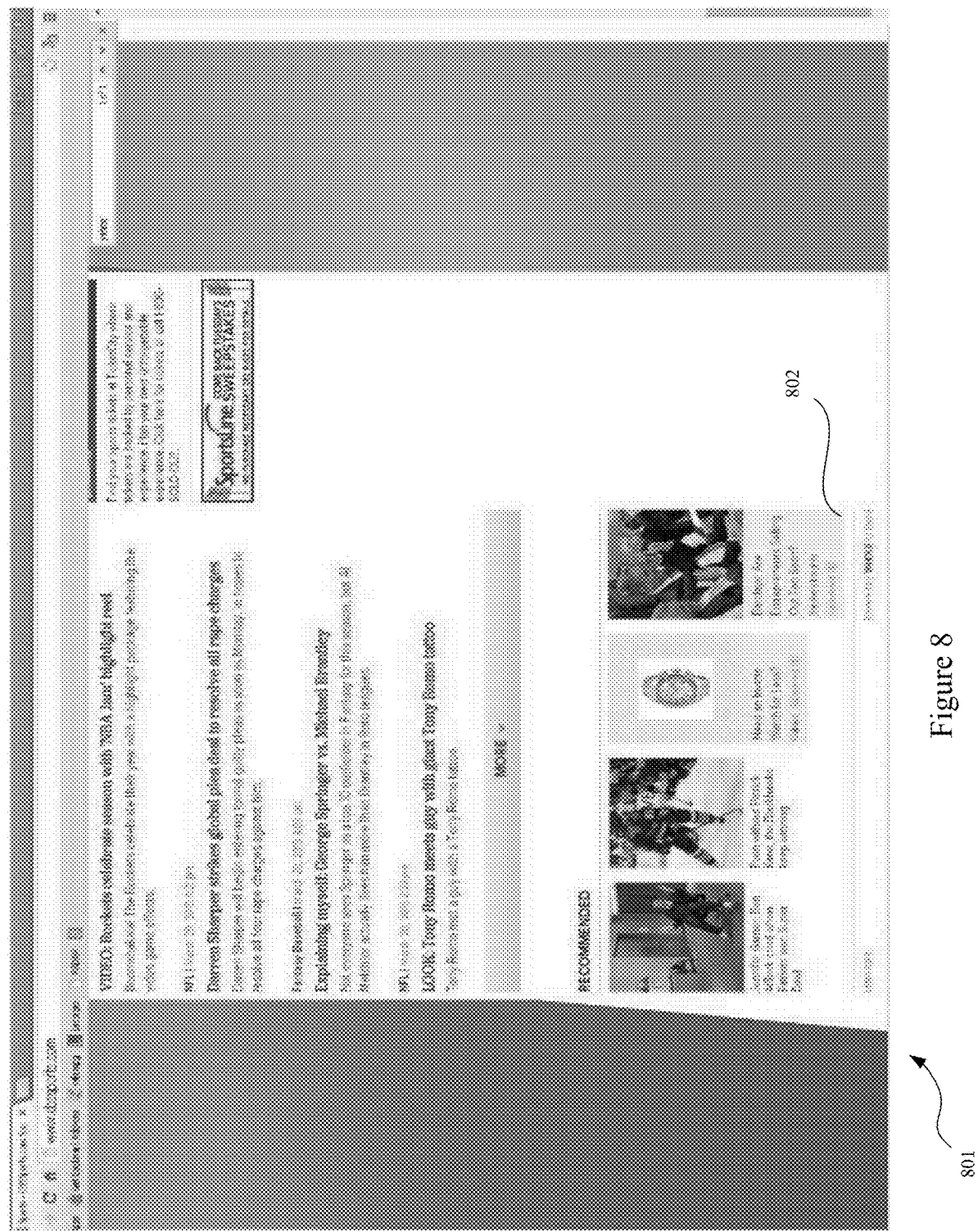
FIG. 8 shows a business-partner webpage with a content-referring module, in accordance with an example embodiment.

FIG. 8 shows a business-partner webpage with a content-referring module, in accordance with an example embodiment. In an example embodiment, software for a business partner (e.g., CBS Interactive or CBS sports) might display webpage 801 to its users. Webpage 801 includes a recommendation module 802 that (a) is provided by an online content service, e.g., Yahoo!, and (b) recommends text articles to viewers of the business-partner's webpage. In an example embodiment, the online content service might track the content-consumption events related to the text articles recommended in this module, rather than the website presenting the recommendation module 802.

With the above embodiments in mind, it should be understood that the inventions might employ various computer-implemented operations involving data stored in computer systems. Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the content item might be the players on a fantasy sports team, rather than more traditional media. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising operations of:
    obtaining a plurality of events chronologically generated by a plurality of users of an online content service during a specified period of time, wherein each of the plurality of events is a content-consumption event;
    identifying any content items associated with each event and annotating each of the content items with (a) a plurality of metadata attributes associated the tent item and (b) a plurality of metadata attributes associated with the online content service;
    sorting the plurality of events based on user identifier or browser identifier and based on content identifier and ordering sorted events for a specific content item and a specific user of the plurality of users based on time-stamp;
    determining events that make up respective content sessions for the specific content item and for each specific user of the plurality of users, using ordered events for the specific content item and a look-back time period and a look-ahead time period, wherein the look-back time period is usable to determine a landing path describing a first sequence of events that occur proximately before the each specific user arrived at the specific content item, and wherein the look-ahead time period is usable to determine an exit path describing a second sequence of events that occur proximately after the each specific user stops engaging with the specific content item;
    receiving a request from a client device of a user that is not included in the plurality of users for additional content website of the online content service, the user interacting with the specific content item via the client device during a present session; and
    providing, to the client device in response to the request, an additional content item based on the look-back time period and the look-ahead time period as determined for the specific content item and for the each specific user of the plurality of users;
    wherein each operation is executed by one or more processors.

2. The method of claim 1, wherein metadata attributes associated with a content item include content duration or size.

3. The method of claim 1, wherein metadata attributes associated with the online content service include property name, business family name, and region name.

4. The method of claim 1, wherein the present content session ends if timestamps for consecutive events differ by at least thirty minutes.

5. The method of claim 1, wherein the specific content item is a video.

6. The method of claim 1, wherein the look-back time period and the look-ahead time period are based at least in part on a confidence interval derived from a measure of central tendency and a measure of dispersion for a probability distribution.

7. The method of claim 1, wherein each user identifier is annotated with metadata attributes associated with the user identifier.

8. The method of claim 1, wherein the additional content item is provided in a newsfeed provided by the online content service.

9. One or more non-transitory computer-readable media persistently storing instructions that, when executed by a processor, perform the following operations:
   obtain a plurality of events chronologically generated by a plurality of users of an online content service during a specified period of time, wherein the plurality of events are content-consumption events;
   identify any content items associated with each event and annotate each of the content items with (a) a plurality of metadata attributes associated with the content item and (b) a plurality of metadata attributes associated with the online content service;
   sort the plurality of events based on user identifier or browser identifier and on the basis of content identifier and ordering sorted events for a specific content item and a specific user based on timestamp;
   determine events that make up respective content sessions for the specific content item and for each specific user of the plurality of users, using ordered events for the specific content item and a look-back time period and a look-ahead time period, wherein the look-back time period is usable to determine a landing path describing a first sequence of events that occur proximately before the each specific user arrived at the specific content item, and wherein the look-ahead time period is usable to determine an exit path describing a second sequence of events that occur proximately after the each specific user stops engaging with the specific content item;
   receive a request from a client device of a user that is not included in the plurality of users for additional content at a website of the online content service while the user interacts with the specific content item via the client device during a present content session; and
   provide, to the client device in response to the request, an additional content item based on the look-back time period and the look-ahead time period as determined for the specific content item and for the each user of the plurality of users.

10. The computer-readable media of claim 9, wherein metadata attributes associated with a content item include content duration or size.

11. The computer-readable media of claim 9, wherein metadata attributes associated with the online content service include property name, business family name, and region name.

12. The computer-readable media of claim 9, wherein the present content session ends if timestamps for consecutive events differ by at least thirty minutes.

13. The computer-readable media of claim 9, wherein the specific content item is a video.

14. The computer-readable media of claim 9, wherein the look-back time period and the look-ahead time period based at least in part on a confidence interval derived from a measure of central tendency and a measure of dispersion for a probability distribution.

15. The computer-readable media of claim 9, wherein each user identifier is annotated with metadata attributes associated with the user identifier.

16. The computer readable media of claim 9, wherein the additional content item is provided in a newsfeed provided by the online content service.

17. A method, comprising operations of:
   obtaining an event associated with a user identifier of an online content service, wherein the event is a recent event in a stream of a plurality of events that are content-consumption events;
   identifying any content items associated with the event and annotating each content item with (a) a plurality of metadata attributes associated with the content item and (b) a plurality of metadata attributes associated with the online content service;
   determining that the event is part of respective content sessions for a specific content item and for each specific user of a plurality of users based on a look-back time period and a look-ahead time period, wherein the look-back time period is usable to determine a landing path describing a first sequence of events that occur proximately before the each specific user arrived at the specific content item, and wherein the look-ahead time period is usable to determine an exit path describing a second sequence of events that occur proximately after the each specific user stops engaging with the specific content item;
   receiving a request from a client device of a user that is not included in the plurality of users for additional content at a website while the user interacts with the specific content item via the client device during a present content session; and
   providing, to the client drive in response to the request, an additional content item based on the look-back time period and the look-ahead time period as determined for the specific content item and for the each specific user of the plurality of users;
   wherein each operation is executed by one or more processors in real-time or near real-time.

18. The method of claim 17, wherein the user identifier is annotated with metadata attributes associated with the user identifier.

* * * * *